Patented Oct. 9, 1951

2,570,216

UNITED STATES PATENT OFFICE 2,570,216

TREATMENT OF OXIDATION PRODUCTS

Henry K. Dice and Robert L. Mitchell, Corpus Christi, Tex., assignors to Celanese Corporation of America, a corporation of Delaware No Drawing. Application February 3, 1949,
Serial No. 74,467

12 Claims. (Cl. 260—452)

This invention relates to the treatment of oxidation products and relates more particularly to an improved process for the treatment of the oxidation products obtained by the vapor phase partial oxidation, with air or oxygen, of aliphatic hydrocarbons, such as propane, butane or mixtures thereof.

The vapor phase, partial oxidation of aliphatic hydrocarbons, such as propane, butane or mixtures thereof, employing air or oxygen as the oxidizing agent, yields a complex mixture of products including formaldehyde, acetaldehyde, formic acid, methanol, acetone, methylal and other acetals, methyl ethyl ketone, tetrahydrofuran and other oxides as well as certain peroxides. The oxidation is effected by mixing butane or propane with a predetermined amount of air or oxygen, heating the mixture to reaction temperature and allowing the resulting exothermic oxidation reaction to proceed to the desired degree. Since only a partial oxidation is desired, the reaction temperature must be controlled within precise limits and completely halted when the desired degree of oxidation has been effected. The oxidation reaction may be halted effectively by lowering the temperature of the gaseous reaction mixture so that the oxidation reaction will no longer be self-supporting. The lowering of the temperature may be accomplished conveniently, for example, by quenching the hot reaction gases with a circulating stream of a cool aqueous medium. On being quenched, the oxygenated organic compounds are initially absorbed to a substantial degree in the circulating aqueous medium and a hot aqueous solution of oxygenated organic compounds is obtained. Under the temperatures prevailing, however, the greater percentage of the more volatile of said oxygenated products, except for the formaldehyde, formic acid and some of the methanol present, subsequently flash off from the aqueous quenching medium. The aqueous mixture remaining constitutes an aqueous solution of oxygenated products comprising essentially formaldehyde which, after being cooled, is advantageously recycled for the purpose of effecting further quenching. The recycled quenching medium is preferably maintained at a controlled formaldehyde concentration by constantly taking off a side-stream of the circulating solution and introducing an equivalent volume of water into the system. Since the oxygenated products formed during the partial oxidation include both aldehydes and alcohols and since both high temperature as well as acidic conditions prevail during the quenching step, which acidic conditions are due to the formic acid and the peroxides produced, the formation of formals, acetals and esters by interaction of these compounds in the quenching medium is strongly favored. These reactions are highly disadvantageous since the compounds thus formed not only reduce the yield of the more desirable and valuable alcohols and aldehydes but the various formals, acetals and esters formed are found to be difficult to separate economically from many of the other products present.

It is, therefore, an important object of this invention to provide an improved process for the quenching and treatment of the gaseous mixture of oxygenated products obtained upon the partial oxidation of aliphatic hydrocarbons whereby the formation of acetals, formals and esters may be minimized.

Other objects of this invention will appear from the following detailed description.

We have now found that the formation of acetals, formals and esters by the interaction of the acids, alcohols and aldehydes present in the aqueous mixture of products obtained on quenching the hot gaseous reaction mixture produced by the vapor-phase, partial oxidation of aliphatic hydrocarbons, with air or oxygen, may be greatly minimized by controlling the pH of the quenching medium employed so as to reduce the acidity thereof. The pH should preferably be so controlled that on quenching the hot reaction gases the pH of the hot aqueous solution formed is no less than about 4.0. The pH may be allowed to increase somewhat above this value but should not be allowed to increase to the point where the hot aqueous solution formed becomes alkaline since, under alkaline conditions, the aldehydes present will resinify and appreciable losses of aldehyde will result. Most advantageously the pH of the aqeuous quenching medium is so controlled that the pH of the hot solution formed is maintained at about 5.0.

To maintain the pH of the aqueous medium at the desired value, the acids which are formed during the vapor phase oxidation must be at least partly neutralized and the peroxides decomposed. The most effective means for maintaining the pH of the quench liquor at the desired value efficiently and economically is to decompose the peroxides present in the hot gaseous reaction mixture obtained as the product of the vapor phase hydrocarbon oxidation and then, when said hot reaction gases are cooled by quenching with a circulating aqueous medium, to neutralize the acids in solution in said circulating aqueous quenching medium by adding a suitable, alkaline neutralizing agent thereto as said quenching medium is being recycled. Effective mixing is thus obtained. As examples of alkaline neutralizing agents which may be employed there may be mentioned sodium hydroxide, or lime. Most conveniently, the alkaline neutralizing agent is introduced into the system in the form of an aqueous solution of the desired concentration.

Decomposition of the peroxides is effected by bringing the hot gaseous mixture of oxidation reaction products into contact with an inert surface having a catalytic effect on said peroxides. For example, the hot reaction gases may be passed over carbon steel rings, soda glass tubes, aluminum, activated charcoal, tungstic oxide or alumina. Preferably, we employ carbon steel rings as they possess adequate physical strength, are readily available and retain their peroxide decomposing activity for very extended periods. The carbon steel rings are most conveniently employed by packing a suitable tube or vessel with said rings and then passing the hot mixture of reaction gases through the tube or vessel, after the partial oxidation is substantially completed, so that the gases come into intimate contact with the steel surfaces. The peroxides formed during the vapor phase oxidation are found to be very readily decomposed by this treatment. Usually, a contact time of the order of about 0.1 to 0.2 second is sufficient to destroy effectively the peroxides present in the hot gaseous reaction mixture. After the peroxides are decomposed, the hot reaction gases are quenched with the aqueous medium, the latter being recycled, as described, and the pH adjusted to the desired value by the introduction of an alkaline neutralizing agent therein. The formaldehyde concentration of the neutralized aqueous quenching medium is preferably maintained at about 10 to 15% by weight by taking off a side-stream, as described, and adding water to the recycling quenching medium. The water may be added conveniently with the alkaline neutralizing agent although additional water may be added separately.

In order further to illustrate our invention but without being limited thereto the following example is given:

*Example*

A mixture of isobutane, oxygen and inert gases in which the oxygen is present in an amount of about 10% by volume, based on the butane, is continuously formed and continuously heated to a temperature of about 600 to 650° F. A partial oxidation of the butane takes place under these conditions yielding a mixture of hot reaction gases containing unreacted isobutane and inert gases together with a number of oxygenated organic compounds. The oxygenated organic compounds formed include not only formaldehyde and other higher aldehydes, formic acid and various peroxides but also acetone, methyl ethyl ketone, methanol, and various other compounds. The mixture of hot reaction gases thus obtained is passed through a tube filled with carbon steel rings at such velocity that the contact time therewith is of the order of about 0.13 second. After passing over the carbon steel surfaces, which serve to catalytically decompose the peroxides present, the hot reaction gases are quenched below oxidation temperature by being brought into intimate contact with a cooled aqueous medium. On being brought into contact with the hot gases the temperature of the aqueous medium is raised substantially, reaching a temperature of the order of 200° F. The aqueous quenching medium absorbs substantially all of the formaldehyde and formic acid in the reaction gases together with some methanol, while the greater percentage of the remaining reaction products which are initially absorbed ultimately flash off from the solution formed in the vessel in which the quenching step is effected. The hot aqueous solution remaining is then cooled, a side stream taken off so that the formaldehyde may be separated therefrom and the cooled solution, after being diluted and the acids therein substantially neutralized by the addition thereto of a suitable quantity of a 20% by weight aqueous solution of sodium hydroxide to adjust the pH thereof to about 5, is then recycled to effect further quenching. The oxygenated reaction products which are flashed off are subsequently absorbed in water in a separate operation and are later separated and purified. The oxidation and the quenching operation with the cooled, recycled neutralized quench liquor as well as the absorption of the oxygenated reaction products are carried out as a continuous operation.

When the yields of oxygenated products obtained by the process described above employing a peroxide decomposition step while adjusting the acidity of the quench liquor to a pH of 5 are compared to the results obtained when the peroxides are not decomposed and the acidity of the recycled quench liquor is at a pH of about 2.3, the usual value obtained without the expedients described above, a major change in the character of the products obtained is noted. The amount of methyl formate formed is found to have decreased 93%, the acetals (of average molecular weight of 88) are reduced 95%, the methanol yield is increased 47% and the formaldehyde yield increased 46%. The presence of methylal can no longer be detected in the products obtained while the higher alcohols which are separated after final purification has been achieved are found to have been increased by 37%. These changes are, of course, due to the substantial reduction achieved in the amount of acetals, formals and esters formed.

Thus, not only is the subsequent separation and purification of the oxygenated products formed vastly simplified but the decrease in acidity and in peroxide content has been found to substantially decrease the corrosion problem inherent in handling the hot, strongly acid solutions formed.

It is to be understood that the foregoing detailed description is given merely by way of illustration and that many variations may be made therein without departing from the spirit of our invention.

Having described our invention, what we desire to secure by Letters Patent is:

1. In a process for the production of mixed oxygenated organic compounds by the vapor phase partial oxidation of aliphatic hydrocarbons wherein a mixture of hot reaction gases is formed, the steps which comprise subjecting the hot reaction gases to intimate contact with a cool liquid medium comprising essentially an aqueous solution of formaldehyde and maintaining the acidity of the hot aqueous solution formed at a pH of no less than about 4.0 by the addition of an inorganic alkaline neutralizing agent.

2. In a process for the production of mixed oxygenated organic compounds by the vapor phase partial oxidation of aliphatic hydrocarbons wherein a mixture of hot reaction gases is formed, the steps which comprise bringing the hot reaction gases into contact with a catalytic surface to decompose the peroxides present in said reaction gases, then subjecting the hot reaction gases thus treated to intimate contact with a cool liquid medium comprising essentially an aqueous solution of formaldehyde and maintaining the acidity of the hot aqueous solution formed at a pH of no less than about 4.0 by the addition of an inorganic alkaline neutralizing agent.

3. In a process for the production of mixed oxygenated organic compounds by the vapor phase partial oxidation of aliphatic hydrocarbons wherein a mixture of hot reaction gases is formed, the steps which comprise subjecting the hot reaction gases to intimate contact with a cool liquid medium comprising essentially an aqueous solution of formaldehyde to which an inorganic alkaline neutralizing agent has been added so as to maintain the acidity of the hot aqueous solution formed after contact with said hot gases at a pH of no less than about 4.0, cooling the resulting hot aqueous solution, then adding the inorganic alkaline neutralizing agent thereto and cycling the cooled neutralized aqueous formaldehyde solution thus obtained to effect further contact with the hot reaction gases.

4. In a process for the production of mixed oxygenated organic compounds by the vapor phase partial oxidation of aliphatic hydrocarbons wherein a mixture of hot reaction gases is formed, the steps which comprise bringing the hot reaction gases into contact with a catalytic surface to decompose the peroxides present in said reaction gases, then subjecting the hot reaction gases thus treated to intimate contact with a cool liquid medium comprising essentially an aqueous solution of formaldehyde to which an inorganic alkaline neutralizing agent has been added so as to maintain the acidity of the hot aqueous solution formed after contact with said hot gases at a pH of no less than about 4.0, cooling the resulting hot aqueous solution, then adding the inorganic alkaline neutralizing agent thereto and cycling the cooled neutralized aqueous formaldehyde solution thus obtained to effect further contact with the hot reaction gases.

5. In a process for the production of mixed oxygenated organic compounds by the vapor phase partial oxidation of aliphatic hydrocarbons wherein a mixture of hot reaction gases is formed, the steps which comprise subjecting the hot reaction gases to intimate contact with a cool liquid medium comprising essentially an aqueous solution of formaldehyde to which an inorganic alkaline neutralizing agent has been added so as to maintain the acidity of the hot aqueous solution formed after contact with said hot gases at a pH of no less than about 4.0, cooling the resulting hot aqueous solution, taking off a side stream of said hot aqueous solution, then adding an aqueous solution of an inorganic alkaline neutralizing agent to the remainder of said solution, and cycling the cooled, neutralized aqueous formaldehyde solution thus obtained to effect further contact with the hot reaction gases.

6. In a process for the production of mixed oxygenated organic compounds by the vapor phase partial oxidation of aliphatic hydrocarbons wherein a mixture of hot reaction gases is formed, the steps which comprise bringing the hot reaction gases into contact with a catalytic surface to decompose the peroxides present in said reaction gases, then subjecting the hot reaction gases thus treated to intimate contact with a cool liquid medium comprising essentially an aqueous solution of formaldehyde to which an inorganic alkaline neutralizing agent has been added so as to maintain the acidity of the hot aqueous solution formed after contact with said hot gases at a pH of no less than about 4.0, cooling the resulting hot aqueous solution, taking off a side stream of said hot aqueous solution, then adding an aqueous solution of an inorganic alkaline neutralizing agent to the remainder of said solution, and cycling the cooled, neutralized aqueous formaldehyde solution thus obtained to effect further contact with the hot reaction gases.

7. In a process for the production of mixed oxygenated organic compounds by the vapor phase partial oxidation of aliphatic hydrocarbons wherein a mixture of hot reaction gases is formed, the steps which comprise subjecting the hot reaction gases to intimate contact with a cool liquid medium comprising essentially an aqueous solution of formaldehyde to which sodium hydroxide has been added so as to maintain the acidity of the hot aqueous solution formed after contact with said hot gases at a pH of no less than about 4.0, cooling the resulting hot aqueous solution, taking off a side stream of said hot aqueous solution, adding an aqueous solution of sodium hydroxide to the remainder of said solution, and cycling the cooled, neutralized aqueous formaldehyde solution thus obtained to effect further contact with the hot reaction gases.

8. In a process for the production of mixed oxygenated organic compounds by the vapor phase partial oxidation of aliphatic hydrocarbons wherein a mixture of hot reaction gases is formed, the steps which comprise bringing the hot reaction gases into contact with a catalytic surface to decompose the peroxides present in said reaction gases, then subjecting the hot reaction gases thus treated to intimate contact with a cool liquid medium comprising essentially an aqueous solution of formaldehyde to which sodium hydroxide has been added so as to maintain the acidity of the hot aqueous solution formed after contact with said hot gases at a pH of no less than about 4.0, cooling the resulting hot aqueous solution, taking off a side stream of said hot aqueous solution, adding an aqueous solution of sodium hydroxide to the remainder of said solution, and cycling the cooled, neutralized aqueous formaldehyde solution thus obtained to effect further contact with the hot reaction gases.

9. In a process for the production of mixed oxygenated organic compounds by the vapor phase partial oxidation of aliphatic hydrocarbons wherein a mixture of hot reaction gases is formed, the steps which comprise subjecting the hot reaction gases to intimate contact with a cool liquid medium comprising essentially an aqueous solution containing 10 to 15% by weight of formaldehyde to which sodium hydroxide has been added so as to maintain the acidity of the hot aqueous solution formed after contact with said hot gases at a pH of no less than about 4.0, cooling the resulting hot aqueous solution, taking off a side stream of said hot aqueous solution, adding an aqueous solution of sodium hydroxide to the remainder of said solution, and cycling the cooled, neutralized aqueous formaldehyde solution thus obtained to effect further contact with the hot reaction gases.

10. In a process for the production of mixed oxygenated organic compounds by the vapor phase partial oxidation of aliphatic hydrocarbons wherein a mixture of hot reaction gases is formed, the steps which comprise subjecting the hot reaction gases to intimate contact with a cool liquid medium comprising essentially an aqueous solution containing 10 to 15% by weight of formaldehyde to which sodium hydroxide has been added so as to maintain the acidity of the hot aqueous solution formed after contact with said hot gases at a pH of no less than about 4.0, cooling the resulting hot aqueous solution, taking off a side stream of said hot aqueous solution, adding an aqueous solution of sodium hydroxide to the remainder of said solution, and cycling the cooled, neutralized aqueous formaldehyde solution thus obtained to effect further contact with the hot reaction gases, the recycling, neutralized solution being cooled sufficiently so that the aqueous solution formed on contact with the hot reaction gases will be heated to a temperature no greater than about 200° F.

11. In a process for the production of mixed oxygenated organic compounds by the vapor phase partial oxidation of aliphatic hydrocarbons wherein a mixture of hot reaction gases is formed, the steps which comprise bringing the hot reaction gases into contact with a catalytic surface to decompose the peroxides present in said reaction gases, then subjecting the hot reaction gases thus treated to intimate contact with a cool liquid medium comprising essentially an aqueous solution containing 10 to 15% by weight of formaldehyde to which sodium hydroxide has been added so as to maintain the acidity of the hot aqueous solution formed after contact with said hot gases at a pH of no less than about 4.0, cooling the resulting hot aqueous solution, taking off a side stream of said hot aqueous solution, adding an aqueous solution of sodium hydroxide to the remainder of said solution, and cycling the cooled, neutralized aqueous formaldehyde solution thus obtained to effect further contact with the hot reaction gases.

12. In a process for the production of mixed oxygenated organic compounds by the vapor phase partial oxidation of aliphatic hydrocarbons wherein a mixture of hot reaction gases is formed, the steps which comprise bringing the hot reaction gases into contact with a catalytic surface to decompose the peroxides present in said reaction gases, then subjecting the hot reaction gases thus treated to intimate contact with a cool liquid medium comprising essentially an aqueous solution containing 10 to 15% by weight of formaldehyde to which sodium hydroxide has been added so as to maintain the acidity of the hot aqueous solution formed after contact with said hot gases at a pH of no less than about 4.0, cooling the resulting hot aqueous solution, taking off a side stream of said hot aqueous solution, adding an aqueous solution of sodium hydroxide to the remainder of said solution, and cycling the cooled, neutralized aqueous formaldehyde solution thus obtained to effect further contact with the hot reaction gases, the recycling, neutralized solution being cooled sufficiently so that the aqueous solution formed on contact with the hot reaction gases will be heated to a temperature no greater than about 200° F.

HENRY K. DICE.
ROBERT L. MITCHELL.

REFERENCES CITED

The following references are of record in the file of this patent:

UNITED STATES PATENTS

| Number | Name | Date |
|---|---|---|
| 2,412,014 | Sherwood | Dec. 3, 1946 |
| 2,462,413 | Meath | Feb. 22, 1949 |